United States Patent
Yamase et al.

[11] Patent Number: 5,677,259
[45] Date of Patent: Oct. 14, 1997

[54] GAS OIL DESULFURIZATION CATALYST AND DESULFURIZATION METHOD

[75] Inventors: Osamu Yamase; Masao Inoguchi; Yoshihisa Kozawa, all of Tokyo, Japan

[73] Assignees: Showa Shell Sekiyu K.K.; Petroleum Energy Center, both of Tokyo, Japan

[21] Appl. No.: 74,380

[22] Filed: Jun. 10, 1993

[30] Foreign Application Priority Data

Jun. 10, 1992 [JP] Japan .................. 4-176212

[51] Int. Cl.⁶ .................. B01J 23/16; B01J 21/12
[52] U.S. Cl. .................. 502/313; 502/314; 502/66
[58] Field of Search .................. 502/332, 314, 502/220, 219, 66, 74, 79, 313

[56] References Cited

U.S. PATENT DOCUMENTS

| | | | |
|---|---|---|---|
| 3,758,512 | 9/1973 | Kanetaka et al. | 502/350 |
| 3,915,848 | 10/1975 | Kravitz et al. | 208/216 R |
| 3,933,623 | 1/1976 | Durkin et al. | 208/216 R |
| 4,035,353 | 7/1977 | Kanetaka et al. | 502/314 |
| 4,071,437 | 1/1978 | Engelhard et al. | 208/137 |
| 4,303,625 | 12/1981 | Cull | 423/213.2 |
| 4,395,327 | 7/1983 | Pelrine | 208/216 R |
| 4,454,026 | 6/1984 | Hensley, Jr. et al. | 502/314 |
| 4,655,906 | 4/1987 | Bjornson et al. | 208/217 |
| 4,693,991 | 9/1987 | Bjornson et al. | 502/220 |
| 4,837,193 | 6/1989 | Akizuki et al. | 502/314 |
| 4,908,344 | 3/1990 | Pereira et al. | 502/314 |
| 5,011,593 | 4/1991 | Ware et al. | 208/216 R |

FOREIGN PATENT DOCUMENTS

| | | |
|---|---|---|
| 2253818 | 11/1974 | France . |
| 1954032 | 5/1970 | Germany . |
| 2733049 | 2/1978 | Germany . |

*Primary Examiner*—Glenn A. Caldarola
*Attorney, Agent, or Firm*—Sughrue, Mion, Zinn, Macpeak & Seas

[57] ABSTRACT

A gas oil desulfurization catalyst and the desulfurization method are disclosed, which comprises (A) at least one kind of a metal selected from the group consisting of Mo and W, (B) at least one kind of a metal selected from the group consisting of Co and Ni, and (C) at least one kind of a metal selected from Re and Ir, as the active components.

9 Claims, No Drawings

GAS OIL DESULFURIZATION CATALYST AND DESULFURIZATION METHOD

FIELD OF THE INVENTION

The present invention relates to a gas oil desulfurization catalyst and a desulfurization method for a gas oil using the catalyst.

BACKGROUND OF THE INVENTION

Recently, for the protection of the health of a human being, the improvement of an amenity property, etc., an international tendency of an environmental protection has been abruptly increased. In the United States of America, President Bush proposed the Amendment to the Atmospheric Cleaning Law, composed of the three points of (1) a measure against acidic rain, (2) a measure to clean atmosphere of city areas, and (3) a measure against harmful chemical substances, in July, 1989. The Amendment contains the measures for reducing $SO_x$, $NO_x$, hydrocarbons, particulates and carcinogenic substances. In particular, in regard to the regulation on a quality of gas oil as diesel fuel oil, the sulfur content will be severely regulated to be not more than 0.05% by weight as in the State of California since October, 1993.

Also, in Japan, in the report of "What the measure to reduce the future automobile exhaust gas should be" presented by the Central Pollution Measure Council in December, 1989, it is stated to intentionally reduce the sulfur content in a gas oil as diesel fuel oil to 0.05% by weight as a theme in relation to the measure for reduction of automobile exhaust gas.

In Japan, a gas oil is mainly produced as a product by hydrodesulfurizing a straight-run gas oil fraction (90% boiling point max. 360° C.) obtained from the distillate of a crude oil and, if necessary, adding thereto a flow improver. In the U.S.A, a cracked gas oil, mainly LCO (light cycle oil), obtained from a cracking unit such as FCC (fluid catalytic cracking process), etc., is partially mixed with the straight-run gas oil but the LCO has the features that the content of aromatics is larger than that of the straight-run gas oil, the cetane index is low, and the sulfur compounds contained therein have a low reactivity. If the hydrogenation of the aromatic rings in the LCO, the ring opening of the naphthene rings therein, and the deep desulfurization thereof become possible, it will become also possible in Japan to mix the LCO with the straight-run gas oil.

The type of the sulfur compounds in these gas oils differs according to the kind of the raw gas oil fraction. There are the features that in the straight-run gas oil fraction, a nonthiophene content is larger than a thiophene content, and in the nonthiophene the content of aliphatic sulfides (mainly cyclic sulfides) is large, and in the thiophene the content of bicyclic and tricyclic thiophenes is large. In the cracked gas oil fraction, the content of thiophenes is larger, therefore the amount of sparingly reactive sulfur compounds is increased. The reactivity of these sulfur compounds largely differs according to (1) the structure of the compound and (2) the number and the positions of the substituents, but since alkyl-substituted thiophenes are most reluctant to react, in order to make possible the deep desulfurization of the LCO, the effective desulfurization of the alkyl-substituted thiophenes becomes the most important conclusive factor.

The reaction conditions of conventional desulfurization methods are shown in Table 1 below.

TABLE 1

|  | Hydrodesulfurization Condition of Kerosene, Gas Oil | Hydrodesulfurization Condition of Vacuum Gas Oil |
|---|---|---|
| Reaction Temp. (°C.) | 290 to 380 | 400 to 450 |
| Pressure (kg/cm²) | 30 to 60 | 60 to 120 |
| LHSV* (liter/hr.) | 2 to 4 (t/m³h) | 1 to 3.5 |
| Reactor Inlet Gas (Nm³/kl) | 70 to 140 | 180 to 530 |

LHSV: Liquid Hourly Space Velocity

The improvement of the desulfurization performance deeply relates not only to a high performance catalyst but also to the selection of the reaction conditions for effectively obtaining the high performance of the catalyst. If it is intended to carry out the deep desulfurization using an existing ordinary desulfurization unit or without making a large revamp such a desulfurization unit, the condition for the desulfurization reaction is restricted to a certain extent.

The improvement of the desulfurization performance may be expected by using a conventional catalyst and changing the foregoing conditions to a severe direction or by improving a part of a conventional catalyst but on the other hand, in such a case, there are large disadvantages related to the reduction of the qualities of the refined oil, such as the color, the color stability, etc., the reconstruction of the apparatus, lowering of the life of the catalyst, etc., as shown in following Table 2.

TABLE 2

| | Advantages | Disadvantages |
|---|---|---|
| Increase of Reaction Temp. | Improvement of activity | 1. Lowering of catalyst activity with the deposition of carbonaceous substances<br>2. Shortage of time on stream<br>3. Formation of dry slidge (in refined oil) |
| Increase of Reaction Pressure | Improvement of activity Constraint of deposition of carbonaceous substances | 1. Large reconstruction of refining unit and incidental facilities |
| Lowering of LHSV* | Improvement of activity | 1. Lowering of product yield<br>2. Increase of process unit or enlarging of diameter of reactor |
| Improvement of purity of reactor inlet gas ($H_2$) | Improvement of activity | 1. Increase of capacity of compressor with the increase of the amount of circulating gas<br>2. Lowering of quench controlling ability |

LHSV: Liquid Hourly Space Velocity

Hitherto, as a catalyst for the hydrodesulfurization of a distillate, a Co-Mo series catalyst is generally used and in the case of also requiring the denitrogenation and the hydrogenation of aromatic rings, a Ni-Mo series catalyst or a Ni-Co-Mo series catalyst is generally used. The characteristics required for the catalyst are mainly that (1) the catalyst has a good selectivity for the desulfurization reaction, (2) the catalyst is tough and can keep the activity to the deposition of carbonaceous substances, etc.

However, using the conventional catalyst, it is almost impossible to reduce the sulfur content of a gas oil to 0.05% by weight while keeping the temperature compensation degree and the yield for the refined oil to the present level although the situation differs according to the nature of the oil.

SUMMARY OF THE INVENTION

The object of the present invention is to provide a high performance catalyst for a gas oil desulfurization, capable of carrying out the deep desulfurization without substantially changing the reaction temperature, the reaction pressure, the LHSV, etc.

According to the first aspect of the present invention, there is provided a catalyst for a gas oil desulfurization comprising (A) at least one kind of a metal belonging to the VIB group in the periodic table selected from the group consisting of Mo and W;

(B) at least one kind of a metal belonging to the VIII group in the periodic table selected from the group consisting of Co and Ni, and (C) at least one metal selected from the group consisting of Re and Ir as the active components.

According to the second aspect of the present invention, there is provided a desulfurization method for a gas oil, which comprises treating a gas oil in the presence of the foregoing catalyst under the conditions of a reaction temperature of from 300° to 390° C., a reaction pressure of from 20 to 60 kg/cm², and preferably from 30 to 50 kg/cm², and a liquid hourly space velocity of from 1 to 5 liters/liter-hour, and preferably from 2 to 4 liters/liter-hour.

DETAILED DESCRIPTION OF THE INVENTION

The gas oil desulfurization catalyst of the present invention is explained in detail.

In the catalyst of the present invention, the content of the component (C) described above is preferably from 0.1 to 5% by weight based on the total weight of the catalyst. If the content is less than 0.1% by weight, the effect of the addition of the component is not obtained and if the content is over 5% by weight, the addition effect is scarcely increased and the addition of such a large amount is economically disadvantageous.

The active components described above are generally used by being supported by a carrier composed of an alumina series inorganic oxide or zeolite.

As the alumina series inorganic oxide, alumina, alumina-boria, alumina-silica, alumina-titania, alumina-zirconia, etc., can be used. An alumina hydrate mainly composed of pseudoboemite having crystallite diameter $d_{020}$ of from 50 to 150 Å is a particularly preferable precursor for an alumina series inorganic oxide.

Among them, it is preferred to use a γ-alumina series inorganic oxide wherein 25% or more of the total pore size are distributed in the range of from 25 to 70 Å pore radii and the alumina degassed at a temperature of from 400° to 600° C. shows an acid color with a benzeneazodiphenylamine indicator in a nonaqueous solvent, and the Hammett's acid functional value (Ho) thereof showing the same value as +1.5 or lower.

Moreover, the pore radius of the γ-alumina series inorganic oxide is more preferably from 25 to 40 Å, further preferably from 30 to 35 Å.

As the zeolite, a faujasite Y-type zeolite having Si/Al ratio of 3 to 5 is preferable and a de-aluminum zeolite by acid treatment can also be used. The foregoing zeolite subjected to a treatment such as an ion-exchange treatment can be used. The foregoing zeolite has such a particle size distribution that 20% or less by weight of particles have particle sizes of not larger than 3 μm, from 50 to 70% by weight of particles have particle sizes of from 3 to 12 μm, and from 10 to 40% by weight of particles have particle sizes of from 12 to 30 μm.

There is no particular restriction on the method of supporting the active components described above on the carrier but an impregnation method is most general.

In the catalyst of the present invention, the component (A) is used in the range of from 10 to 20 parts by weight, and preferably from 12 to 18 parts by weight, the component (B) is used in the range of from 2 to 8 parts by weight, and preferably from 3 to 7 parts by weight, and the component (C) is used in the range of from 0.1 to 5 parts by weight, and preferably from 0.2 to 3 parts by weight per 100 parts by weight of the catalyst.

The catalyst of the present invention is prepared by impregnating the carrier with each component as an aqueous solution thereof as the form of a molybdate or the form of molybdenum nitrate in the case of Mo, as the form of ammonium tungstenate in the case of W, as the form of cobalt nitrate in the case of Co, as the form of nickel nitrate in the case of Ni, as the form of rhenium oxide or ammonium perrhenate in the case of Re, and as the form of iridium chloride in the case of Ir, followed by drying and calcining.

The catalyst of the present invention can be used as the desulfurization of a gas oil under the conditions shown in the 2nd aspect of the present invention as described above.

In the present invention, the gas oil is substantially equivalent to the diesel fuel oil (e.g., Nos. 1-D, 2-D, 4-D, as specified, for example, in ASTM D 975).

Then, the present invention will now be illustrated more practically in and by the following non-limiting examples.

EXAMPLE 1

Co and Mo were supported on γ-alumina having a Hammett's acid functional value (Ho) of +1.5 as a carrier by an impregnation method.

The supported amounts of Co and Mo were 3.5% by weight and 15.7% by weight, respectively.

The carrier supporting Co and Mo was dried and calcined. The surface area thereof was 289 m²/g, the pore volume thereof was 0.502 cm³/g, and the average pore radius thereof was 34.8 Å.

After drying the carrier supporting Co and Mo for 12 hours at 120° C., the carrier (154 g) was impregnated with Re using an aqueous solution obtained by dissolving 1 g of $Re_2O_7$ in 130 g of pure water.

The impregnation was carried out under a reduced pressure of about 30 mmHg while adding dropwise the aqueous solution of $Re_2O_7$.

The carrier supporting Co, Mo and Re was further spontaneously dried for 17 hours and then dried at 110° C. for 5 hours to provide a catalyst.

Then, 200 cc of the resulting catalyst was filled in a reactor having a catalyst volume of 200 ml. After drying for 5 hours at 150° C., the catalyst was pre-sulfurized using kerosene the sulfur content of which was controlled to 1.5% by weight, and then the catalyst was used for the desulfurization of a gas oil.

The properties of a gas oil as a raw material, the reaction conditions, and the properties of the produced oil are shown in Table 3 below.

It is preferred that the sulfur content of the produced oil is 0.05% by weight or lower and the color b* is +4.0 or lower.

TABLE 3

Co—Mo Series Catalyst + Re 0.5% (per wt of catalyst)

Reaction Condition:

| Pressure (kg/cm²G) | 40 | 40 | 40 | 40 |
| LHSV (hr⁻¹) | 2 | 2 | 2 | 2 |
| H₂/oil | 1000 | 1000 | 1000 | 1000 |
| Temperature (°C.) | 310 | 330 | 350 | 370 |

|  | Property of Raw Gas Oil | Property of Produced Oil | | | |
| --- | --- | --- | --- | --- | --- |
| Sulfur Content (wt %) | 0.80 | 0.10 | 0.06 | 0.02 | 0.01 |
| Desulfurization Ratio (%) |  | 87.5 | 92.5 | 97.5 | 98.8 |
| Cetane Index*¹ | 42.7 | 43.8 | 47.0 | 45.0 | 44.8 |
| Distillation (°C.)*² | 208–367 | 190–361 | 205–369 | 191–358 | 189–358 |
| Color*³ |  |  |  |  |  |
| L* | 98 | 100 | 101 | 100 | 100 |
| a* | −10 | −7 | −2 | −2 | −3 |
| b* | +37 | +21 | +7 | +6 | +7 |

*¹: ASTM D 976
*²: ASTM D 86
*³: Color system recommended by Commission International de l'Eclairage in 1976
L* is the numerical value showing the extent of lightness, a* the numerical value showing the extent of red (+) ←→ green (−) and b* the numerical value showing the extent of yellow (+) ←→ blue (−), which were measured by a colorimetric color difference meter (Type CT-210, made by Minolta Camera Co., Ltd.).
(Same as in Tables 4 to 6 below)

COMPARATIVE EXAMPLE 1

By following the same procedure as in Example 1 except that the operation of impregnating Re was omitted, a catalyst was prepared and was used similarly for the desulfurization of a gas oil.

The properties of the gas oil used as the raw material, the reaction conditions, and the properties of the produced oil are shown in Table 4 below.

TABLE 4

Co—Mo Series Catalyst

Reaction Condition:

| Pressure (kg/cm²G) | 40 | 40 | 40 | 40 |
| LHSV (hr⁻¹) | 2 | 2 | 2 | 2 |
| H₂/oil | 1000 | 1000 | 1000 | 1000 |
| Temperature (°C.) | 310 | 330 | 350 | 370 |

TABLE 4-continued

|  | Property of Raw Gas Oil | Property of Produced Oil | | | |
| --- | --- | --- | --- | --- | --- |
| Sulfur Content (wt %) | 0.80 | 0.11 | 0.05 | 0.03 | 0.03 |
| Desulfurization Ratio (%) |  | 86.3 | 93.8 | 96.3 | 96.3 |
| Cetane Index*¹ | 42.7 | 46.6 | 47.0 | 47.2 | 46.9 |
| Distillation (°C.)*² | 208–367 | 192–367 | 201–367 | 188–365 | 189–365 |
| Color*³ |  |  |  |  |  |
| L* | 98 | 98 | 100 | 101 | 101 |
| a* | −10 | −11 | −5 | −5 | −14 |
| b* | +37 | +53 | +20 | +15 | +38 |

EXAMPLE 2

Co and Mo were supported on γ-alumina having a Hammett's functional value (Ho) of +1.5 as a carrier by an impregnation method.

The supported amounts of Co and Mo were 4.2% by weight and 13.1% by weight, respectively.

The carrier supporting Co and Mo was dried and calcined. The surface area thereof was 246.0 m²/g, the pore volume thereof was 0.404 cm³/g, and the average pore radius was 32.8 Å.

The carrier (160 g) supporting Co and Mo was impregnated with Re using an aqueous solution prepared by dissolving 0.463 g of NH₄ReO₄ in 128 g of pure water.

The impregnation was carried out under a reduced pressure while adding dropwise the aqueous solution of NH₄ReO₄.

The carrier supporting Co, Mo and Re was spontaneously dried for 8 hours, then dried at 120° C. for 2 hours, and thereafter, the carrier was placed in an electric furnace while increasing the temperature to 400° C. at a temperature-raising rate of 100° C./hour and calcined at 400° C. for 2.5 hours to provide a catalyst.

Then, 200 cc of the resulting catalyst was filled in a reactor having a catalyst volume of 200 ml, after drying the catalyst at 150° C. for 5 hours, the catalyst was presulfurized using kerosene the sulfur content of which was controlled to 1.5% by weight and used for the desulfurization of a gas oil.

The properties of the gas oil used as the raw material, the reaction conditions, and the properties of the produced oil are shown in Table 5 below.

TABLE 5

Co—Mo Series Catalyst + Re 0.2% (per wt of catalyst)

Reaction Condition:

| Pressure (kg/cm²G) | 30 | 30 | 30 | 30 |
| LHSV (hr⁻¹) | 4 | 4 | 2 | 2 |
| H₂/oil | 125 | 125 | 125 | 250 |
| Temperature (°C.) | 350 | 360 | 355 | 355 |

TABLE 5-continued

| | Property of Raw Gas Oil | Property of Produced Oil | | | |
|---|---|---|---|---|---|
| Sulfur Content | 1.04 (wt %) | 412 (wt ppm) | 302 | 102 | 68 |
| Desulfurization Ratio (%) | | 96.0 | 97.1 | 99.0 | 99.3 |
| Cetane Index[*1] | 56.0 | 59.5 | 59.2 | 59.3 | 59.3 |
| Distillation (°C.)[*2] | 209–369 | 201–364 | 198–360 | 200–362 | 200–363 |
| Color[*3] | | | | | |
| L* | 100.2 | 97.8 | 98.2 | 98.6 | 97.3 |
| a* | −0.8 | −2.4 | −5.0 | −1.7 | −1.8 |
| b* | +4.2 | −2.0 | +2.7 | +3.9 | +4.1 |

COMPARATIVE EXAMPLE 2

By following the same procedure as in Example 2 except that the impregnation operation of Re was omitted, a catalyst was prepared and used similarly for the desulfurization of a gas oil.

The properties of the gas oil used as the raw material, the reaction conditions, and the properties of the produced oil are shown in Table 6 below.

TABLE 6

| Co—Mo Series Catalyst | | | | | |
|---|---|---|---|---|---|
| Reaction Condition: | | | | | |
| Pressure (kg/cm²G) | 30 | 30 | 30 | 30 | |
| LHSV (hr⁻¹) | 4 | 4 | 2 | 2 | |
| H₂/oil | 125 | 125 | 125 | 250 | |
| Temperature (°C.) | 350 | 360 | 355 | 355 | |

| | Property of Raw Gas Oil | Property of Produced Oil | | | |
|---|---|---|---|---|---|
| Sulfur Content | 1.04 (wt %) | 577 (wt ppm) | 344 | 136 | 98 |
| Desulfurization Ratio (%) | | 94.5 | 96.7 | 98.7 | 99.1 |
| Cetane Index[*1] | 56.0 | 59.5 | 59.2 | 59.3 | 59.3 |
| Distillation (°C.)[*2] | 209–369 | 201–364 | 198–360 | 200–362 | 200–363 |
| Color[*3] | | | | | |
| L* | 100.2 | 93.6 | 96.8 | 99.5 | 98.3 |
| a* | −0.8 | −2.3 | −5.0 | −3.0 | −2.1 |
| b* | +4.2 | −1.1 | +3.0 | +7.1 | +5.2 |

COMPARATIVE EXAMPLE 3

By following the same procedure as in Example 2 except using γ-alumina having a Hammett's acid functional value (Ho) of −3.3, the surface area of 270 m²/g, the pore volume of 0.56 cm³/g, and the average pore radius of 82.3 Å in place of the γ-alumina used in Example 2, a catalyst was prepared and used similarly for the desulfurization of a gas oil.

The properties of the gas oil used as the raw material, the reaction conditions, and the properties of the produced oil are shown in Table 7 below.

TABLE 7

| Co—Mo Series Catalyst + Re 0.2% (per wt of catalyst) | | | | | |
|---|---|---|---|---|---|
| Reaction Condition: | | | | | |
| Pressure (kg/cm²G) | | 30 | 30 | 30 | 30 |
| LHSV (hr⁻¹) | | 4 | 4 | 2 | 2 |
| H₂/oil | | 125 | 125 | 125 | 250 |
| Temperature (°C.) | | 350 | 360 | 355 | 355 |

| | Property of Raw Gas Oil | Property of Produced Oil | | | |
|---|---|---|---|---|---|
| Sulfur Content | 1.04 (wt %) | 1040 (wt ppm) | 822 | 655 | 624 |
| Desulfurization Ratio (%) | | 90.0 | 92.1 | 93.7 | 94.0 |

COMPARATIVE EXAMPLE 4

By following the same procedure as in Example 2 except using γ-alumina having a Hammett's acid functional value (Ho) of −3.3, the surface area of 265 m²/g, the pore volume of 0.50 cm³/g, and the average pore radius of 18.9 Å in place of the γ-alumina used in Example 2, a catalyst was prepared and used similarly for the desulfurization of a gas oil.

The properties of the gas oil used as the raw material, the reaction conditions, and the properties of the produced oil are shown in Table 8 below.

TABLE 8

| Co—Mo Series Catalyst + Re 0.2% (per wt of catalyst) | | | | | |
|---|---|---|---|---|---|
| Reaction Condition: | | | | | |
| Pressure (kg/cm²G) | | 30 | 30 | 30 | 30 |
| LHSV (hr⁻¹) | | 4 | 4 | 2 | 2 |
| H₂/oil | | 125 | 125 | 125 | 250 |
| Temperature (°C.) | | 350 | 360 | 355 | 355 |

| | Property of Raw Gas Oil | Property of Produced Oil | | | |
|---|---|---|---|---|---|
| Sulfur Content | 1.04 (wt %) | 1550 (wt ppm) | 1435 | 1352 | 1196 |
| Desulfurization Rate (%) | | 85.1 | 86.2 | 87.0 | 88.5 |

As described above, according to the present invention, the sulfur content in a gas oil can be lowered to 0.05% or lower by using a conventional desulfurization unit.

In particular, the catalyst of the present invention has the advantages that the desulfurization activity is high at a temperature of from 350° to 370° C. and the product obtained by using the catalyst of the present invention has a good color in spite of employing a deep desulfurization.

While the invention has been described in detail and with reference to specific embodiments thereof, it will be apparent to one skilled in the art that various changes and modifications can be made therein without departing from the spirit and scope thereof.

What is claimed is:

1. A gas oil desulfurization catalyst comprising
   (A) at least one metal selected from the group consisting of Mo and W in a weight amount of 10 to 20 parts,
   (B) at least one metal selected from the group consisting of Co and Ni in a weight amount of 2 to 8 parts, and (C) at least one metal selected from Re and Ir in a weight amount of 0.1 to 5 parts, as the active components;

wherein the active components are supported on a carrier comprising an alumina oxide, of which 25% or more of the pores have a pore size which ranges from 25 to 70 Å and wherein the carrier has a Hammett's acid functional value (Ho) of +1.5 or lower.

2. The gas oil desulfurization catalyst of claim 1, wherein the carrier comprises an alumina oxide 25% by distribution of the pore size of which has the pore radius of from 25 to 40 Å.

3. The gas oil desulfurization catalyst of claim 1, wherein the carrier comprises an alumina inorganic oxide 25% by distribution of the pore size of which has the pore radius of from 30 to 35 Å.

4. A gas oil desulfurization catalyst comprising (A) at least one metal selected from the group consisting of Mo and W in a weight amount of 10 to 20 parts, (B) at least one metal selected from the group consisting of Co and Ni in a weight amount of 2 to 8 parts, and (C) at least one metal selected from Re and Ir in a weight amount of 0.1 to 5 parts, as the active components;

wherein the active components are supported on a carrier comprising a zeolite.

5. The gas oil desulfurization catalyst of claim 4, wherein the zeolite is a faujasite Y zeolite having a Si/Al ratio of 3 to 5.

6. The gas oil desulfurization catalyst of claim 4, wherein the zeolite is a de-aluminated zeolite subjected to acid treatment.

7. The gas oil desulfurization catalyst of claim 1, wherein the alumina oxide is γ-alumina.

8. The gas oil desulfurization catalyst of claim 1, wherein said metal (A) selected from the group consisting of Mo and W, and said metal (B) selected from the group consisting of Co and Ni are supported on said carrier before said metal (C) selected from the group consisting of Re and Ir is supported on said carrier.

9. The gas oil desulfurization catalyst as claimed in claim 8, wherein said carrier is produced by the steps of:

(a) impregnating said carrier with said metal (A) selected from the group consisting of Mo and W, and said metal (B) selected from the group consisting of Co and Ni, (b) drying and calcining said carrier from step (a), and (c) impregnating said carrier from step (b) with said metal (C) selected from the group consisting of Re and Ir.

\* \* \* \* \*